(12) United States Patent
Lieberman et al.

(10) Patent No.: US 10,685,373 B2
(45) Date of Patent: Jun. 16, 2020

(54) METHOD AND SYSTEM FOR TRACKING TELEPHONE CALLS

(75) Inventors: Todd Lieberman, Lasayette Hill, PA (US); Jeffrey Weisberg, Philadelphia, PA (US)

(73) Assignee: MARCHEX SALES, LLC, Las Vegas, NV (US)

( * ) Notice: Subject to any disclaimer, the term of this patent is extended or adjusted under 35 U.S.C. 154(b) by 0 days.

(21) Appl. No.: 13/294,436

(22) Filed: Nov. 11, 2011

(65) Prior Publication Data

US 2012/0059709 A1    Mar. 8, 2012

Related U.S. Application Data

(62) Division of application No. 11/985,188, filed on Nov. 14, 2007, now Pat. No. 8,442,862.

(60) Provisional application No. 60/865,671, filed on Nov. 14, 2006.

(51) Int. Cl.
*G06Q 30/02* (2012.01)
*H04M 3/487* (2006.01)
*H04M 3/42* (2006.01)

(52) U.S. Cl.
CPC ......... *G06Q 30/0244* (2013.01); *G06Q 30/02* (2013.01); *G06Q 30/0242* (2013.01); *G06Q 30/0246* (2013.01); *H04M 3/42059* (2013.01); *H04M 3/4878* (2013.01)

(58) Field of Classification Search
CPC ... G06Q 30/207; G06Q 30/0211; G06Q 30/00
USPC .................................. 705/14.4, 14.13, 14.41
See application file for complete search history.

(56) References Cited

U.S. PATENT DOCUMENTS

| | | | |
|---|---|---|---|
| 5,339,352 A | | 8/1994 | Armstrong et al. |
| 5,937,390 A | * | 8/1999 | Hyodo ...................... 705/14.61 |
| 5,937,392 A | * | 8/1999 | Alberts ...................... 705/14.52 |
| 6,636,247 B1 | * | 10/2003 | Hamzy et al. ................ 715/808 |
| 6,822,663 B2 | | 11/2004 | Wang |
| 6,850,975 B1 | * | 2/2005 | Danneels ............ G06F 17/3089 707/E17.116 |

(Continued)

FOREIGN PATENT DOCUMENTS

WO    WO 2006/039353    4/2006

OTHER PUBLICATIONS

Gehrke David, Turban Efraim, Determinants of Successful Website Design: Relative Importance and Recommendatoins for Effectiveness, 1999, Proceedings of the 32nd Hawaii International Conference on System Sciences (Year: 1999).*

(Continued)

*Primary Examiner* — Eric T Wong
*Assistant Examiner* — Kevin T Poe
(74) *Attorney, Agent, or Firm* — DLA Piper LLP US

(57) ABSTRACT

A system for tracking telephone calls made in response to advertising campaigns in electronic or other media is provided. The system permits an advertiser to associate specific and distinct telephone numbers with associated advertising campaigns. The system further modifies advertiser-provided information in response to the advertising campaign to which a potential customer responds, and includes the associated telephone number in the modified advertiser information. The system processes telephone calls made to the selected telephone numbers, and provides reports to advertisers of call data associated with the respective advertising campaigns.

49 Claims, 12 Drawing Sheets

(56) References Cited

U.S. PATENT DOCUMENTS

| | | |
|---|---|---|
| 8,108,895 B2 | 1/2012 | Anderson |
| 8,234,174 B1 * | 7/2012 | Eagon et al. .................... 705/22 |
| 8,442,862 B2 | 5/2013 | Lieberman et al. |
| 2001/0029465 A1 * | 10/2001 | Strisower .............. G06F 3/0481 |
| | | 705/14.49 |
| 2002/0057285 A1 * | 5/2002 | Nicholas, III ................ 345/700 |
| 2002/0077130 A1 | 6/2002 | Owensby |
| 2002/0077219 A1 | 6/2002 | Cohen |
| 2002/0082914 A1 * | 6/2002 | Beyda et al. ................... 705/14 |
| 2002/0085027 A1 * | 7/2002 | Kim ...................... G06Q 30/02 |
| | | 715/738 |
| 2003/0177198 A1 * | 9/2003 | Yabe ................. G06F 17/30861 |
| | | 709/217 |
| 2004/0024640 A1 | 2/2004 | Engie |
| 2004/0101123 A1 * | 5/2004 | Garcia .............. H04M 3/42008 |
| | | 379/220.01 |
| 2005/0027882 A1 * | 2/2005 | Sullivan ........... H04L 29/12066 |
| | | 709/244 |
| 2005/0074102 A1 * | 4/2005 | Altberg .................. G06Q 30/02 |
| | | 379/114.1 |
| 2005/0086104 A1 | 4/2005 | McFadden |
| 2005/0144073 A1 | 6/2005 | Morrisroe |
| 2005/0216341 A1 * | 9/2005 | Agarwal et al. ................. 705/14 |
| 2005/0251445 A1 | 11/2005 | Wong |
| 2005/0256766 A1 * | 11/2005 | Garcia .............. G06F 17/30241 |
| | | 705/14.54 |
| 2006/0072733 A1 | 4/2006 | Ryan |
| 2006/0074746 A1 | 4/2006 | Kline |
| 2006/0074747 A1 | 4/2006 | Kline |
| 2006/0074748 A1 | 4/2006 | Kline |
| 2006/0074749 A1 | 4/2006 | Kline |
| 2006/0074751 A1 | 4/2006 | Kline |
| 2006/0184417 A1 | 8/2006 | Van der Linden |
| 2006/0188081 A1 | 8/2006 | Hooper |
| 2006/0212502 A1 * | 9/2006 | Chatterjee ................. G06T 5/20 |
| | | 708/300 |
| 2006/0217135 A1 | 9/2006 | Moore |
| 2007/0038507 A1 | 2/2007 | Kumar |
| 2007/0100956 A1 * | 5/2007 | Kumar .......................... 709/217 |
| 2007/0112689 A1 * | 5/2007 | Brown ................... G06Q 30/00 |
| | | 705/319 |
| 2007/0124207 A1 | 5/2007 | Faber |
| 2007/0198339 A1 | 8/2007 | Shen |
| 2007/0198443 A1 | 8/2007 | Chernev |
| 2007/0239546 A1 * | 10/2007 | Blum ...................... G06Q 30/02 |
| | | 705/14.47 |
| 2008/0059295 A1 | 3/2008 | Schauser et al. |
| 2008/0069735 A1 * | 3/2008 | Chari .................... C07C 251/08 |
| | | 422/400 |
| 2008/0080691 A1 * | 4/2008 | Dolan ............... H04M 3/42195 |
| | | 379/201.01 |
| 2008/0126209 A1 * | 5/2008 | Wong et al. .................... 705/14 |
| 2008/0129815 A1 * | 6/2008 | Jiang .......................... 348/14.02 |
| 2008/0275785 A1 | 11/2008 | Altberg |
| 2009/0010404 A1 | 1/2009 | Zazza |
| 2009/0030774 A1 | 1/2009 | Rothschild |

OTHER PUBLICATIONS

U.S. Appl. No. 11/985,188, 2008-0162286 A1, Jul. 3, 2008, Pending.
Related U.S. Appl. No. 14/045,536.
Related U.S. Appl. No. 14/058,080.
Related U.S. Appl. No. 14/058,037.
Related U.S. Appl. No. 14/065,345.
U.S. Appl. No. 11/985,188, filed Nov. 14, 2007.

* cited by examiner

METHOD AND SYSTEM FOR TRACKING TELEPHONE CALLS

CROSS REFERENCE TO RELATED APPLICATIONS

This application is a Divisional of U.S. patent application Ser. No. 11/985.188, filed Nov. 14, 2007, which, in turn, claims the benefit and priority of U.S. Provisional Application No. 60/865,671, filed Nov. 14, 2006, the disclosures of which are incorporated by reference in their entireties.

FIELD OF THE INVENTION

The invention relates to a system and method for tracking telephone calls, in particular the invention relates to a method and system for assigning telephone numbers to advertising campaigns and tracking the efficacy of the advertising campaigns.

INTRODUCTION

With the advent of internet based advertising, it has become possible to track the efficiency of electronic advertising campaigns with an accuracy hitherto unknown. Advertisers find electronic advertising to be one medium in which the effectiveness of advertising can be measured in such a way as to appropriately budget advertising expenditures to target the most effective types of advertising placements. It would be desirable to extend this sort of precision measurement to advertising campaigns involving telephone contacts with potential customers and leads, and to measure response rates for campaigns utilizing telephone contact, whether in electronic, print, broadcast or, any media.

SUMMARY OF THE INVENTION

In accordance with the present invention, there are provided methods and systems for tracking telephone call contacts with potential customers in the course of advertising campaigns in various media. In one embodiment thereof, there is provided a system for presenting advertisements to a potential customer in which the advertisement contains a telephone number that has been selected by an advertiser in association with a specific campaign to which the advertisement relates. The system includes means for permitting an advertiser to assign respective telephone numbers to any of a plurality of such campaigns. In the case of Internet advertising, the system includes a server for retrieving an electronic contact mechanism, such as a web page or interactive form, and inserting an associated telephone number in dependence upon the advertising campaign to which the user has responded by requesting the electronic contact mechanism. The system further includes a telephone interface and call handling system for establishing telephonic contact with the prospective customer, and for recording the telephone number used for such contact; and a logging system for recording the telephone number employed for the contact, and hence the associated campaign in response to which the contact was established. Furthermore, recording and logging system includes a report generator by which the advertiser may access reports based upon the data recorded by the recording and logging system.

BRIEF DESCRIPTION OF THE DRAWINGS

Additional features of the invention shall be made apparent in the following detailed description, read in connection with the attached figures in which.

DETAILED DESCRIPTION OF THE DRAWINGS

The invention relates to a method and system for tracking telephone calls made to assigned phone numbers associated with advertising campaigns. The system comprises a computer server comprising various engines and platforms for effecting the tracking of telephone calls assigned to various advertising campaigns.

Figure 1:
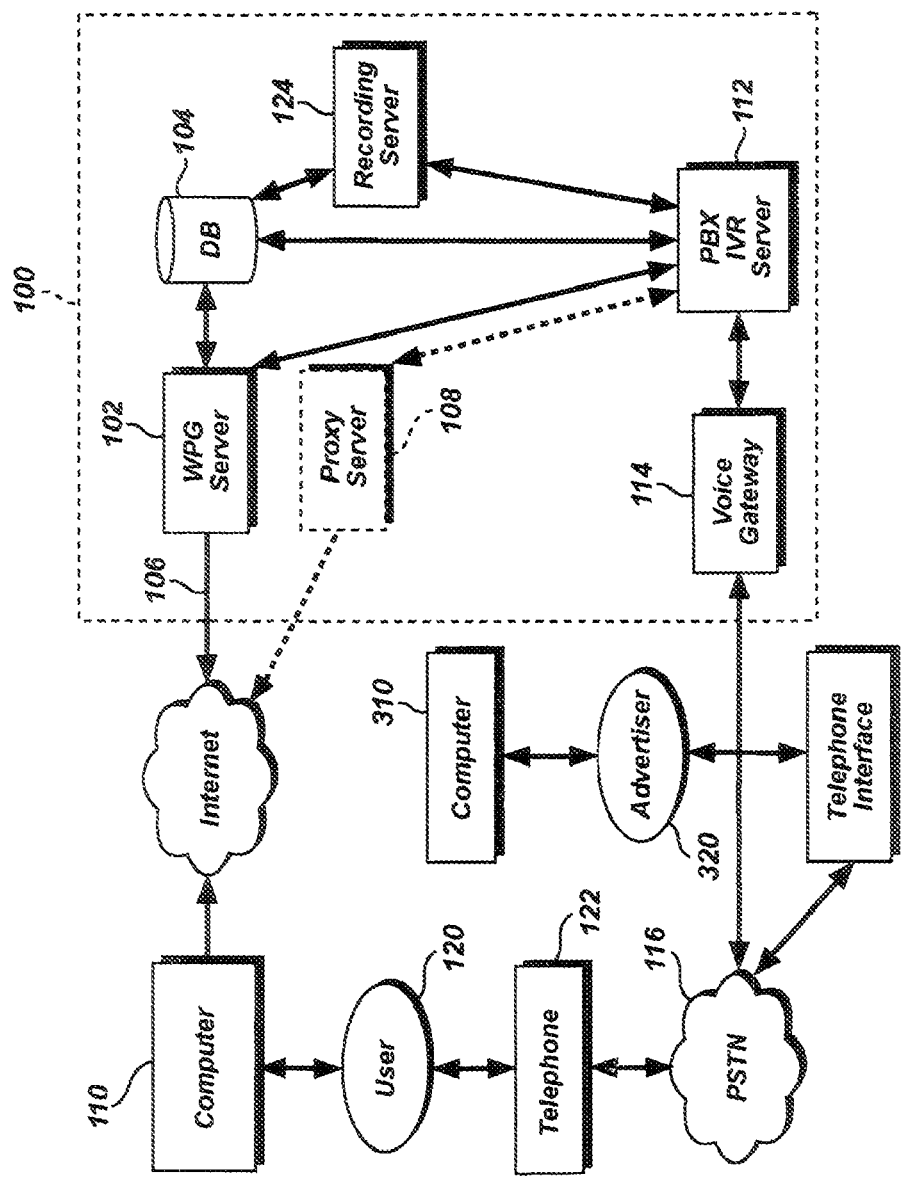
FIG. 1 is a schematic view of the telephone call tracking system in accordance with an embodiment of the present invention.

Referring now to FIG. 1, the system 100 of the present invention comprises a server 102. The server 102 is in communication with a database 104. The database 104 is a collection of data that is organized so that its contents can easily be accessed, managed and updated for storing data utilized in the practice of the invention. The system 100 further includes a recording server for recording and retrieving message data, as described in greater detail below.

The server 102 is connected to the Internet via. an Internet service provider or ISP 106. Typically, the server 102 is a computer. including software package(s), that provides a specific kind of service to client software running on other computers. More specifically, the server 102 is a computer that manages and shares web based applications accessible anytime from any computer 110 connected to the Internet.

The server 102 may also optionally include a proxy web server 108 for proxying documents, such as HTML based web documents, on the Internet. In the present invention, users may access the system 100 of the present invention via the Internet or by some other network protocol, for example through the proxy server 108 or directly through the web server 102.

The system 100 may include a telephony interface 112, such as the ASTERISK open-source telephone platform or PBX server. The telephony interface may, for example, assign and configure phone numbers and otherwise handle and transmit of voice data received by the system 100 and process phone calls through a telephonic connector such as a voice gateway 114 to the public switched telephone network (PSTN) 116 which includes analog and digital voice data.

Users 120 are able to access the system 100 via the Internet. The user 120, may utilize a computer 110 or other web enabled computing device to access the system 100 via the web server 102 or proxy server 108 in various ways known to those skilled in the art, such as by use of any suitable Internet browsing software application. Users may also access the system 100 by use of a suitable telephone or telephonic device 122 capable of interfacing with the PSTN 116. Such devices include, but are not limited to voice telephone. VOIP phone devices, cellular phones, PDAs or the like as known to those skilled in the art. The user accesses the voice PBX/IBR server 112 by using telephone device 122 across the PSTN 116 via the voice gateway 114 as known to those skilled in the art.

The system also includes a recording server 124 for the recording and storing of data, such as voice data initiating from telephone calls placed by users 120 accessing the system telephonically, as set forth in greater detail below.

Figure 2:
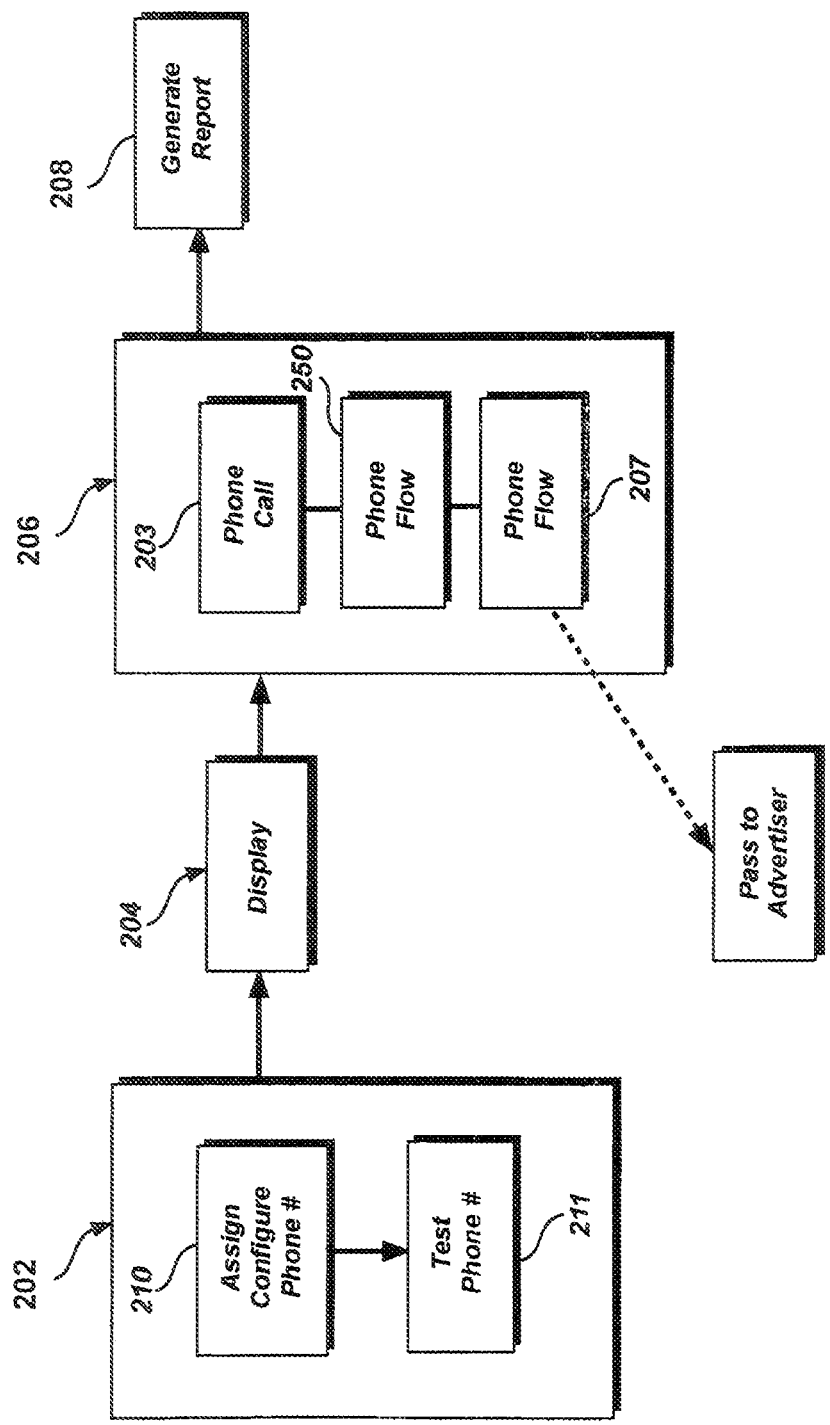
FIG. 2 is a flow diagram of a method carried out by the telephone tracking system of FIG. 1.

Turning now to FIG. 2, the operation of the system 100 includes four phases: the assigning and configuring phase 202, the displaying phase 204, the tracking phase 206, and the report generation phase 208.

The assigning and configuring phase 202 includes assigning and configuring one or more phone numbers residing in the PBX platform to various advertising campaigns. Typically, the assigned phone numbers may originate from blocks of phone numbers pre-purchased from one or more phone carriers. In the assigning and configuring phase 210, one or more phone numbers are assigned and configured in the database 104 to correspond to one or more advertising campaigns, as described in greater detail below.

Optionally, prior to or concurrent with the assignment and configuration phase 202, the assigned phone numbers may be tested in a phone test phase 211. In one form of the invention, before a phone number is assigned to an advertising campaign, the phone number is cleaned to avoid unwanted phone traffic due to previous use of the phone numbers by previous users. This cleaning procedure may employ any suitable mechanism for limiting such unwanted use, such as monitoring phone traffic over an interval of time to determine if unwanted use falls below a defined threshold.

The displaying phase 204 includes displaying the assigned phone number(s) via various media to recipients, such as user 120, of an advertising campaign(s), as described in greater detail below. The customer 120 may initiate a phone call, via telephone device 122, to the system 100.

Figure 5:
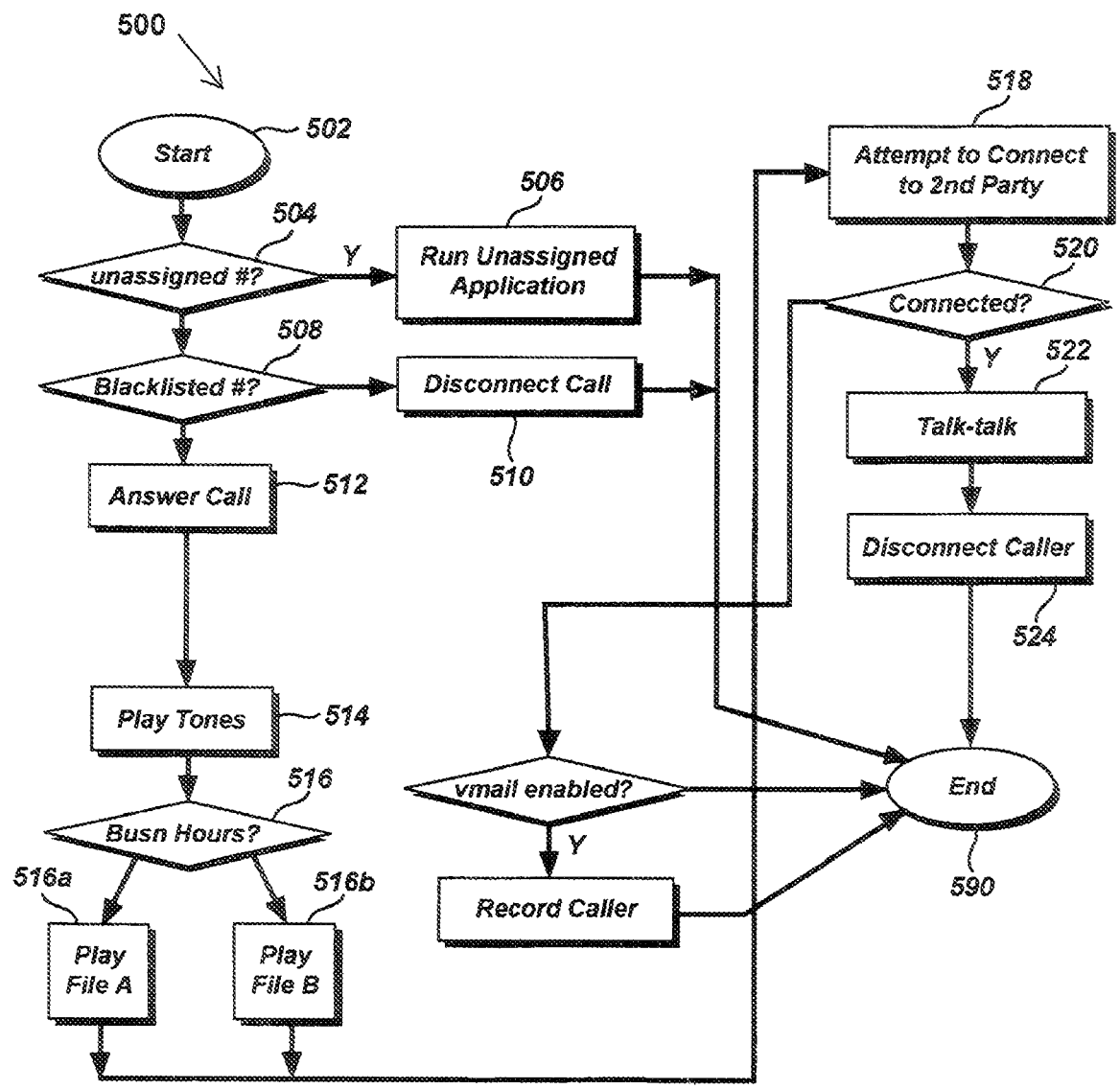
FIG. 5 is a flow diagram of a method carried out by the telephone tracking system of FIG. 1.

The tracking phase 206 includes tracking of phone calls made to the displayed phone number(s). A user 120 calls the phone number displayed in phase 204, proceeds to calling step 203 and accesses the system 100 via the telephone interface. The phone is then routed through the phone flow 250 of the system 100, as shown in FIG. 5 and described in greater detail below. In the phone flow 250, the voice data of the phone call can be recorded by the recording server 124. In addition, the system 100 records in a log, which may be kept in database 104, that a user 120 has called the displayed phone number. Once the data has been logged by the system 100 at step 207, the phone call may optionally be transparently transferred or passed in steps 252 to the advertiser 320 of the advertising campaign for further processing by the advertiser, or otherwise terminated.

In the report generation phase 208, real time reports can also be generated based on the data collected by the system 100. These reports may be made accessible to an advertiser 320 of the advertising campaign. The recorded data can include such identifying data as the caller ID information, the number called by the user, the time the call occurred, the duration of the call, and other information, along with the recorded call itself.

Preferably, the reports can be generated by the system and viewed over the Internet by the advertiser 320, upon access to the server 102, of the system 100, using suitable statistical report means known to those skilled in the art. Sample embodiments of reports so generated are shown in FIGS. 7-12.

The advertiser may assign different telephone numbers to each of multiple advertising campaigns, to permit the advertiser to measure the relative response of such campaigns.

The invention contemplates that for each advertising campaign, phone numbers are assigned by the advertiser based on various criteria, described in greater detail below, and these assigned phone numbers are displayed to user 120 based upon the campaign the user is viewing. The display can be any suitable media on which phone numbers can be communicated to the customer, such as on a web page, a document, a brochure, a radio, advertisement, a newspaper, periodical, or journal, a podcast, a telephone call, and the like.

During the configuration phase 202, phone numbers are assigned to advertising campaigns. Each advertising campaign includes a defined transaction for which the advertiser 320 of the campaign desires to track information. For example, the advertiser 320 may want to track information relating to which of several particular advertising campaigns may have resulted in a call from a user. In one example, the advertising campaign may be a Internet accessible web page displaying one or more phone numbers in which each phone number is assigned based on which Uniform Resource Locator (URL) referred the lead, which search engine the lead used, which search term(s) or keyword(s) were used, and/or other criteria.

Figure 3:
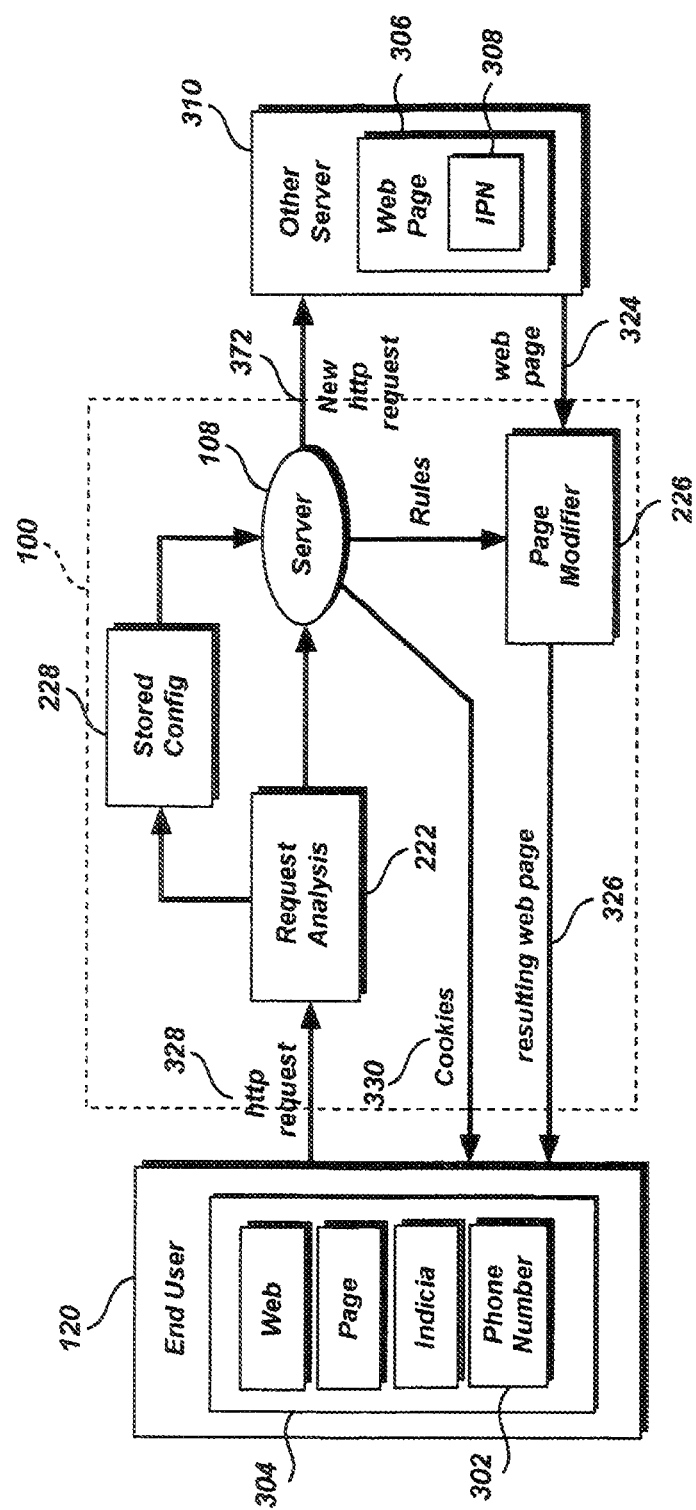
FIG. 3 is a functional block diagram showing operation of a web proxy of the telephone tracking system of FIG. 1.

Turning now to FIG. 3, one preferred form of the system is shown to illustrate the operation of the system 100. In this example, a phone number 302 has been assigned to a particular advertising campaign. In this advertising campaign, the phone number 302 will be displayed on a web page which is accessible to a potential user 120 via the Internet. In one embodiment, it is contemplated that the web page will be based on an existing web page 306 that resides on server 310. The existing web page 306 may be an existing web page 306 of the advertiser, such as the home page or contact page of the advertiser 320. It is contemplated that the existing web page 306 contains at least one existing phone number 308, of the advertiser 320. In order to track responses to an advertisement associated with the campaign, the system 100 operates to replace the existing phone number 308 with campaign phone number 302 while otherwise retaining all the remaining data and formatting of the web page 306. A resulting web page is created and displayed to the potential customer or user 220, containing the assigned campaign phone number 302 instead of the existing phone number 308. Otherwise the web pages presented to the user and the web pages 306 of the advertiser are substantially identical.

To accomplish insertion of the campaign telephone number, the proxy server 108 is used to automatically modify and display the assigned campaign phone number 302 on the pre-existing static or dynamically generated webpage 306. In some embodiments of the automatic modification and display is accomplished as follows. The proxy server 108 receives an http request 328 from a user 120 in response to an advertisement associated with the advertising campaign. The system 100 analyzes various request parameters in step 222, such as the request URL, the http referrer, cookies, and the like to look up the stored configuration data 228 for a particular ad campaign to determine a new web URL and set of page modifications rules 226. The configuration data 228, including the telephone number 302, is stored in the database 104.

A request 372 is then made by the proxy server 108 to the advertiser's server 310 for the existing web page 306 which is intended to be modified. The web page 306 is thereby fetched 324 over the Internet and the modification rules 226 are applied to it and a new URL is assigned to the modified web page 304. The new web page 304 is generated by referencing stored modification rules 226, and modifying the existing web page 306 to display the assigned phone number 302 in place of the existing phone number 308.

For example, in a first advertising campaign a first phone number may be displayed if the user's referring URL is a particular URL corresponding to a link presented in an advertisement. In a second advertising campaign a second phone number may be displayed for a different referring URL, such as the URL of a particular search engine. In a third advertising campaign, a third phone number may be assigned if a particular search term was used to locate the existing web page. These rules are described in greater detail below. When a user 120 calls one of the assigned numbers, the system 100 is capable of determining which advertising campaign generated the lead based upon the phone number utilized by the user 120. For example, if the user 120 initiated a phone call using the second phone number, it would be known that the user viewed the display of second phone number in connection with the second advertising campaign. For example, a customer referring URL may indicate that the customer's http request 328 shows that the customer has utilized a particular search engine, such as GOOGLE®.

Once the page modification rules are applied to the existing web page 306 by the proxy server 108, and the page is thus modified, the resulting modified web page 304 is delivered and displayed 326 to the potential customer 120. A typical modification is that one or more contact phone numbers 308 on the existing page 306 may be replaced with the assigned phone number 302 so that when the user calls the assigned phone number 302, he calls the system 100 of the present invention instead of the existing phone numbers 308. Once in the system 100, the customer phone call can be tracked and the passed on to the client 320 in due course.

In one form of the invention, a cookie 330 can be delivered to the customer 120 with various cookie parameter(s) to facilitate future requests, as is well known in the art.

In another form of the invention, the existing web page 306 may be modified to contain javascript. When a user requests the web page 306 directly from server 310, server 310, the javascript executes and call the system 100. The request analysis 222 may analyze the request as described above. The HTML of the web page 306 is modified to replace the phone number 308 with phone number 302 on the client side, as is known to those skilled in the art. The modified web page 302 is then delivered 326 to the customer 120, as described above. In this way the use of the proxy server 108 is eliminated.

Figure 4:
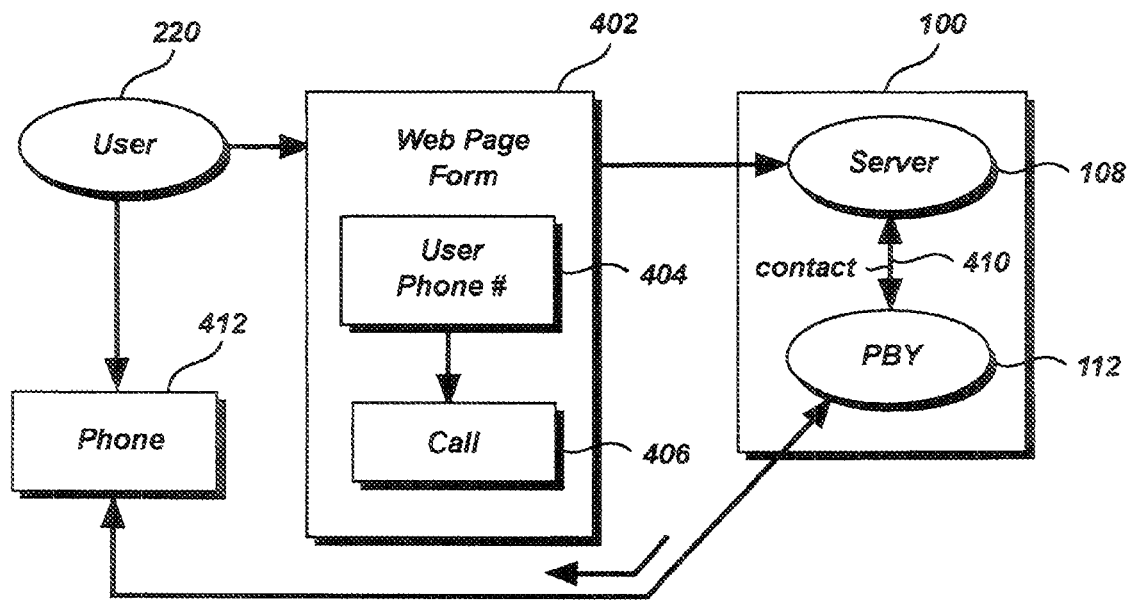
FIG. 4 is a functional block diagram showing a method carried out using a customer contact information form presented by the telephone tracking system of FIG. 1.

In FIG. 4, another way of entering the system 100 of the present invention is illustrated. In this form of the invention a form 402 is provided for a potential customer or user 220 to enter in a phone number 404. A user 220 activates the form 402, by activating the input element 406 of a HTML form, and the customer's phone number 404 is transmitted to system 100. It should be understood that other means of collecting user information and transmitting same are also contemplated by the present invention such as those known by those skilled in the art. The input request 406 is transmitted to the server 108, and the system 100 generates a contact event 410, for example a telephone call via the system PBX 112 to that user's phone 412 via the PSTN. Contact is made with the user 220, and the user 220 is placed in the phone flow, as described below.

The system of the invention contemplates that the step of automatically modifying existing web pages may be customized to include and/or exclude certain phone numbers on the existing web page. For example, the modification rules can specifically include certain phone numbers, such as the main number or the sales number of the advertising campaign client or exclude certain numbers, such as the sales or parts numbers of the advertising campaign client.

Additionally, the assigned phone numbers may be displayed as graphic images, such as jpeg images, instead of as hyperlinks when the phone numbers are displayed as HTML web-based content. In this embodiment, an existing phone number is replaced with pre-generated or a generated-on-the-fly graphic images to create the displayed web page.

The server 108 includes an application that runs a routine for replacing the existing phone numbers with the assigned numbers on the fly based on algorithms used for identifying and parsing phone numbers in html code. When the advertiser 320 assigns telephone numbers to respective campaign's, the advertiser 320 may also identify telephone numbers within the existing web page 306 to be replaced by the system 100.

Turning now to FIG. 5, the phone flow 500 Of the system 100 will now be described. When a user 220 places a phone call to a phone number assigned by the system 100, or requests a call back, the user 220 enters the phone flow 500. It will be recognized that the inclusion and sequence of steps set forth below will depend on whether the call is inbound or outbound.

Before answering or making a call, the system 100 uses the incoming call data for the user's 220 phone call identification to initiate the phone flow routine in step 502. In step 504, the system 100 determines if the phone number through which the customer has reached the system has been assigned to an advertising campaign. If the phone number has not been assigned, the system runs an unassigned phone number application in step 506 and terminates the phone call in step 590.

If the system determines that the phone number is assigned in step 504, the system determines if the phone number has been blacklisted in step 508. For example, a phone number may be blacklisted if the advertiser 320 has disabled receipt or making of certain telephone calls for the corresponding campaign. If the phone number has been blacklisted, the call is disconnected in step 510 and is terminated in step 590.

If the phone number has not been blacklisted in step 508, the system answers the phone call in step 512, and ring tones are played in step 514. In step 516, the routine determines if the call is being received within business hours. If not, then a first file is retrieved from the recording server and played to the user in step 516a. The first file may be, for example, a recording of a first voice message provided by the advertising campaign client, such as an "after hours" message. If the call is being received within business hours, a second file is played in step 516b. The second file may be, for example, a recording of second voice message provided by the advertiser, such as the advertisers normal business hours message. Optionally, the playing of the message may be skipped in either of steps 516a and/or 516b.

In embodiments where the advertiser 320 desires to receive calls from the user 220, after steps 516a or 516b, the system 100 attempts to pass the call to the advertiser's telephone interface configured to receive contact from a user 220 in step 518. If the attempt fails then the call is disconnected in step 520 and passed to the call termination step 590.

If the connection is successful in step 520, then the call proceeds through the advertising's client's call system in step 522. For example, the client 310 may talk with the user 220, the user 220 may be directed to the client's DISA system or operator, or the like.

Once step 522 has completed, the call is disconnected in step 524 and passed to the call termination step 590 whereupon the phone flow routine is completed.

It should be understood that the system 100 may include various applications initiated after step 520, or after step 524. An answer application may be present after step 520, and/or a call wrap-up application may be present after step 524. These applications are known to those skilled in the art.

The phone flow routine permits the system 100 to transparently log data from a customer initiated call and transparently and seamlessly transfer the phone call to the advertising client. To the potential customer, it should appear that the call is being placed directly with the advertising client.

Figure 6:
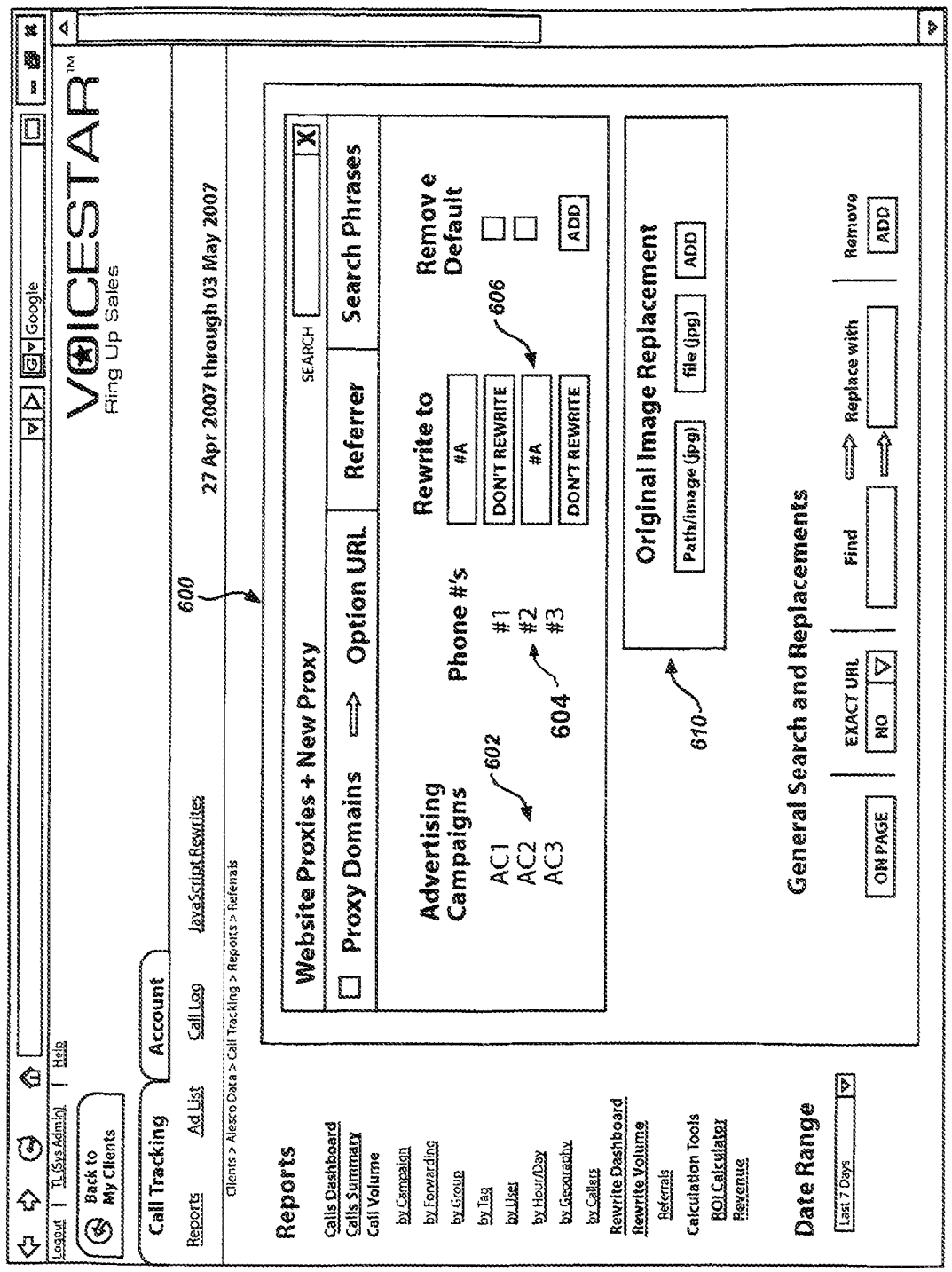
FIG. 6 is an illustration of a graphical client interface provided by the telephone tracking system of FIG. 1.
Figure 7:
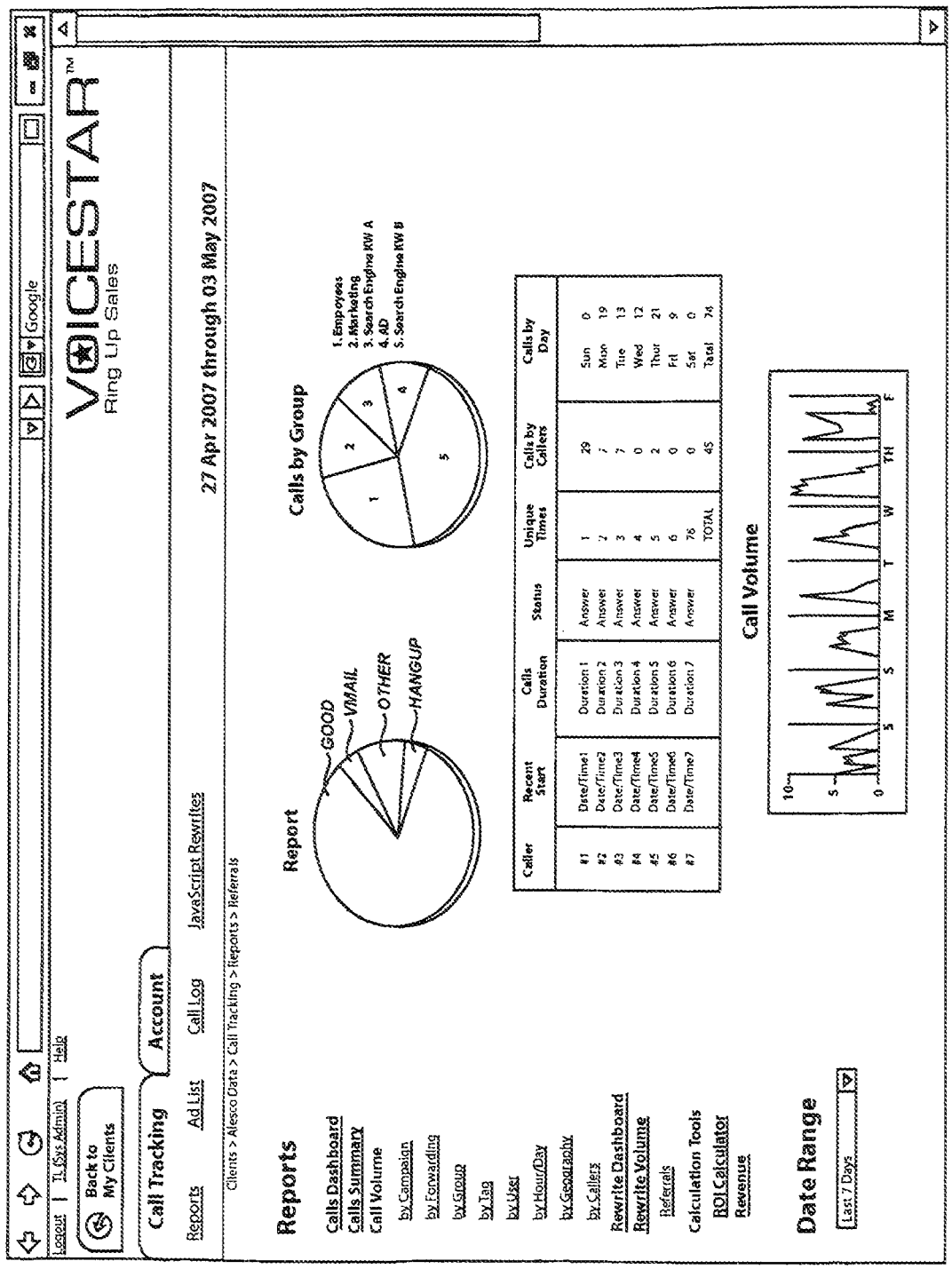
FIGS. 7-12 are illustrations of reports generated by the telephone tracking system of FIG. 1.
Figure 8:
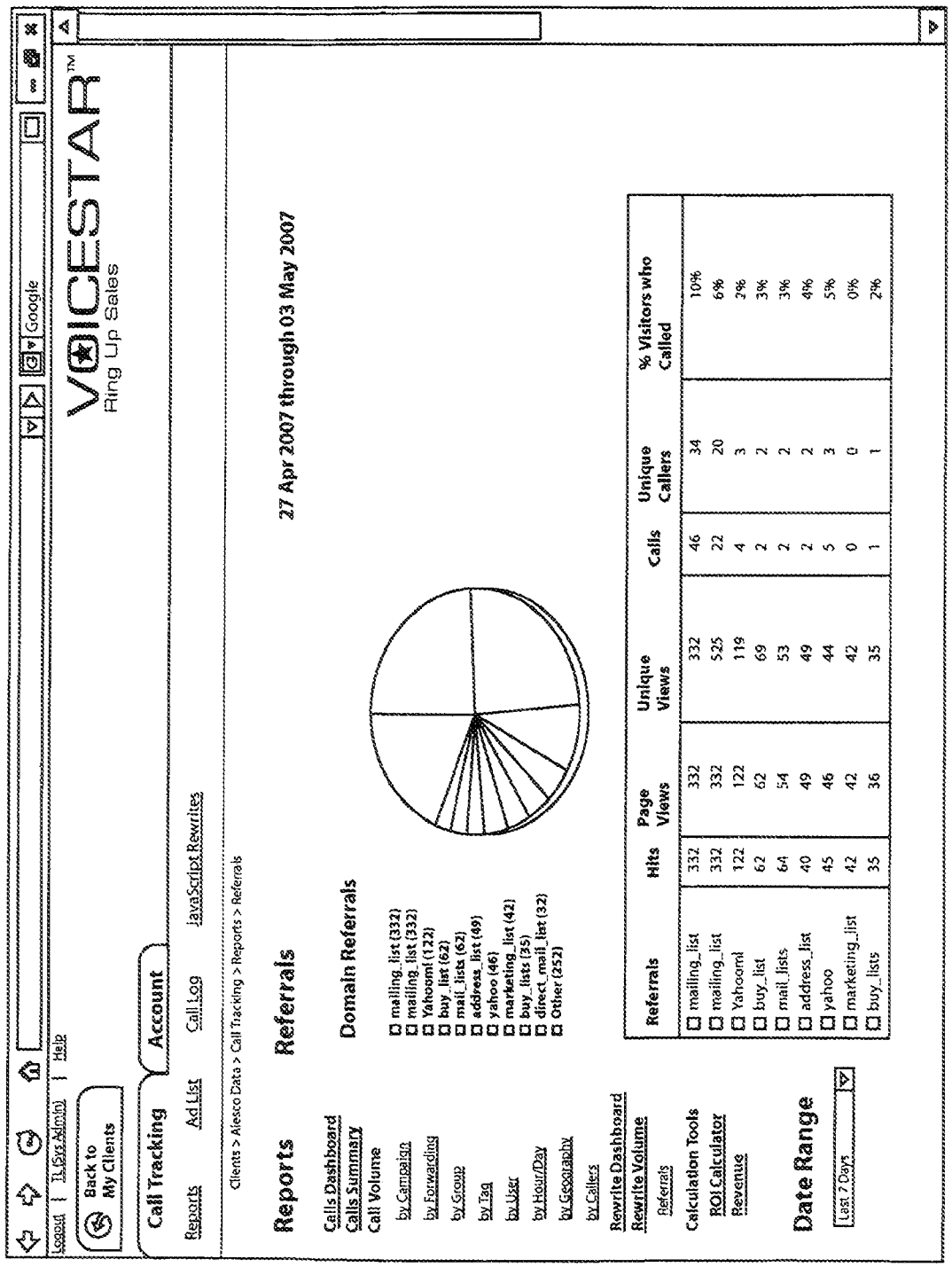
Figure 9:
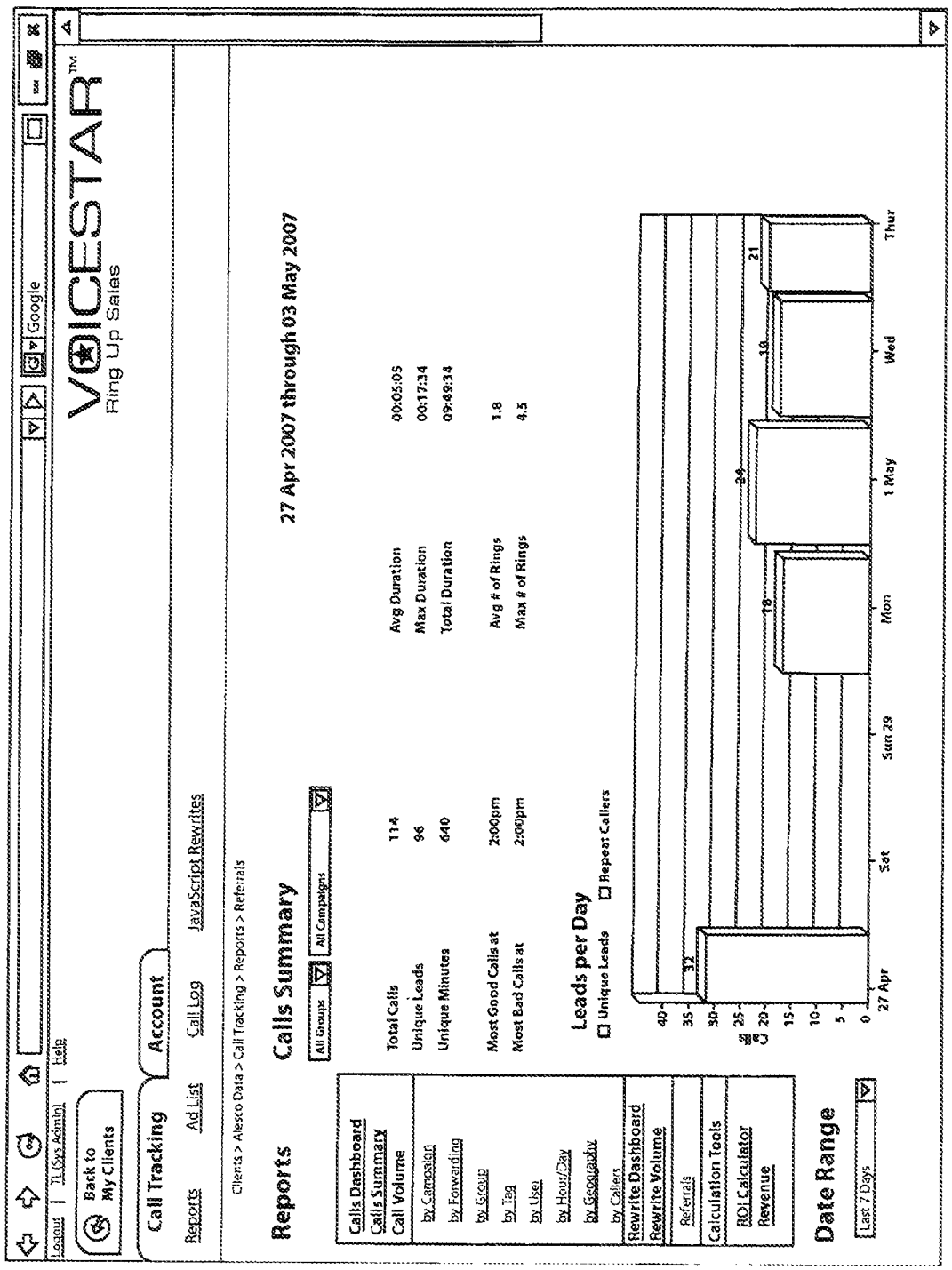
Figure 10:
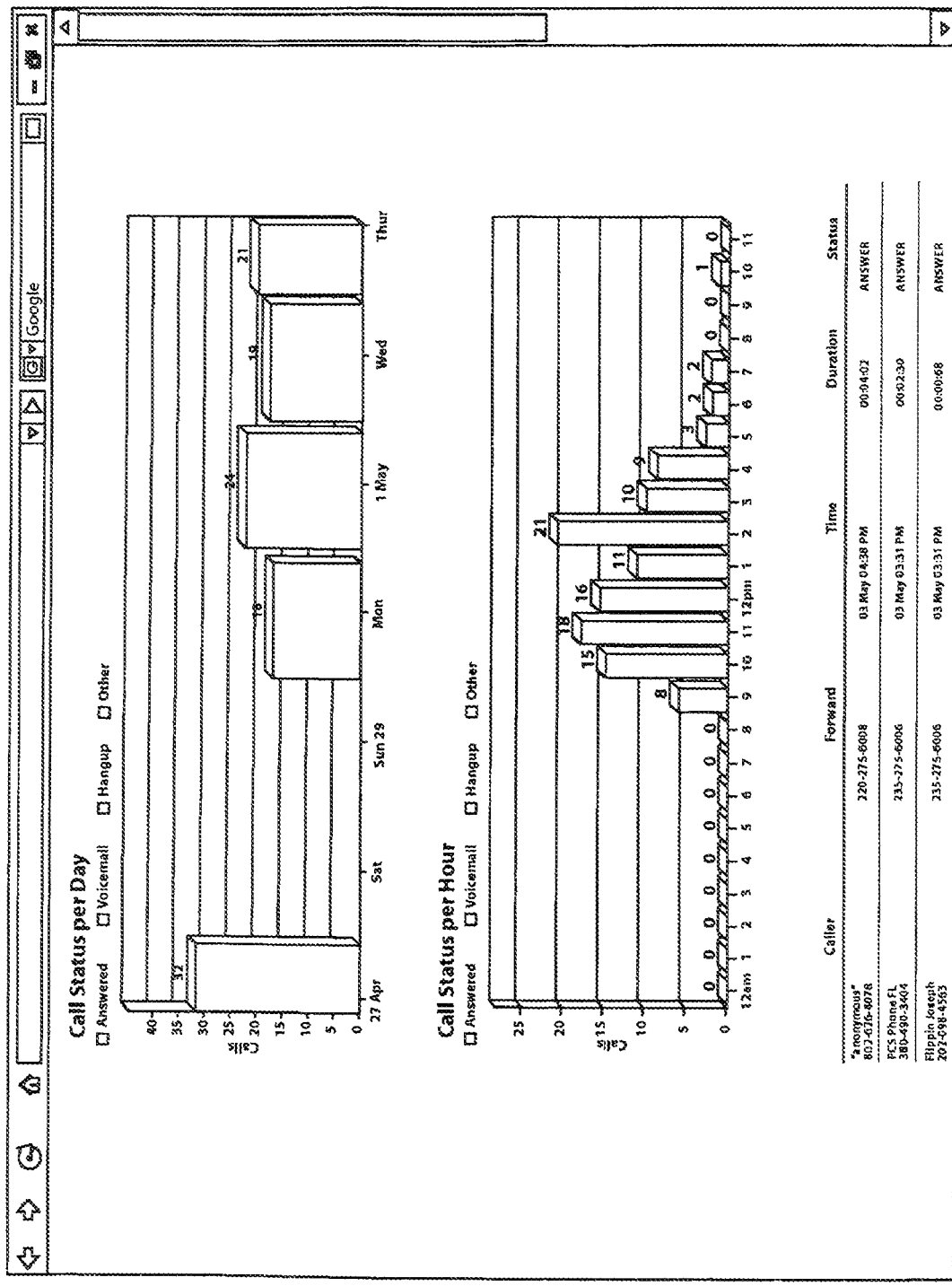
Figure 11:
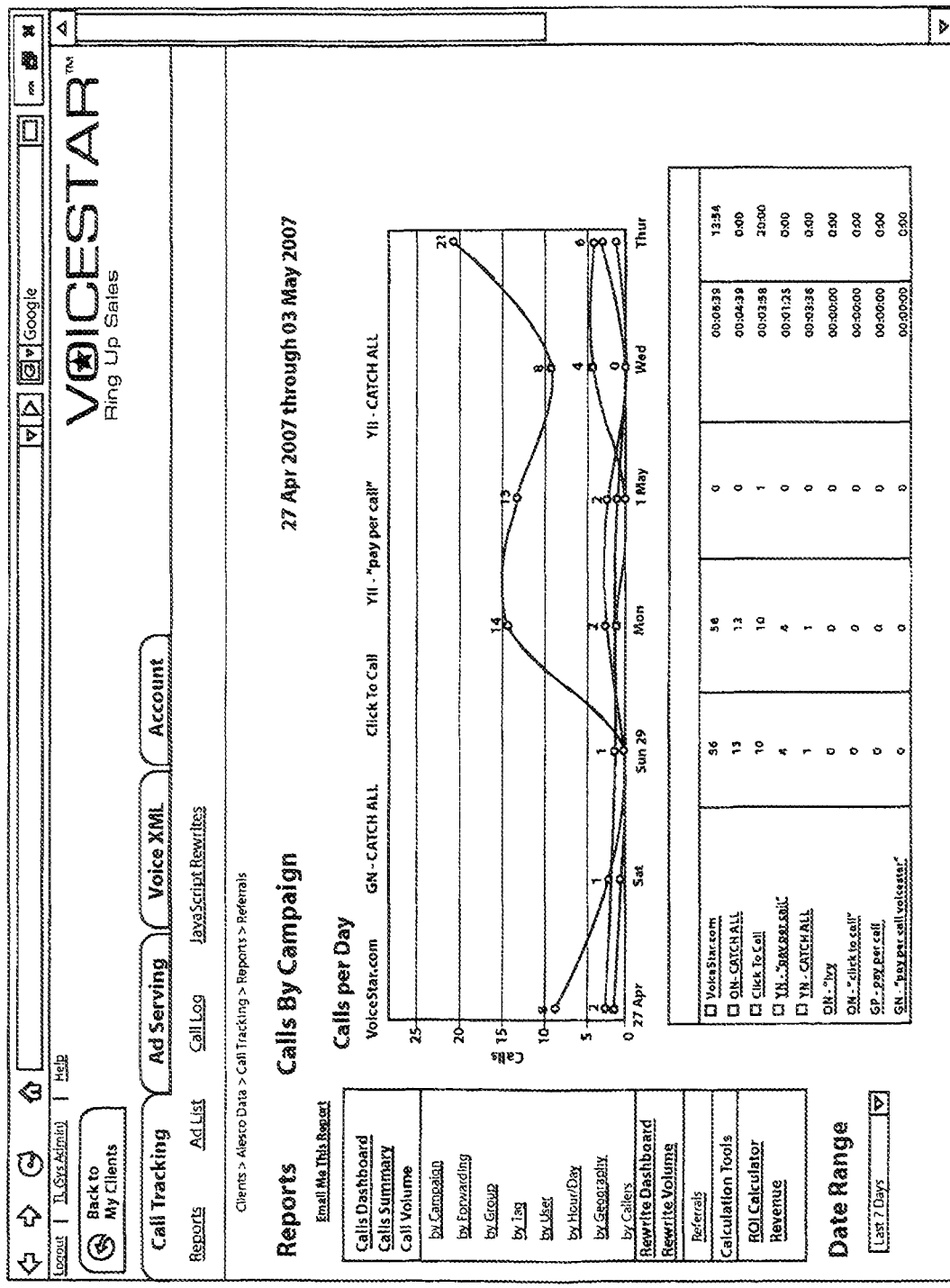
Figure 12:
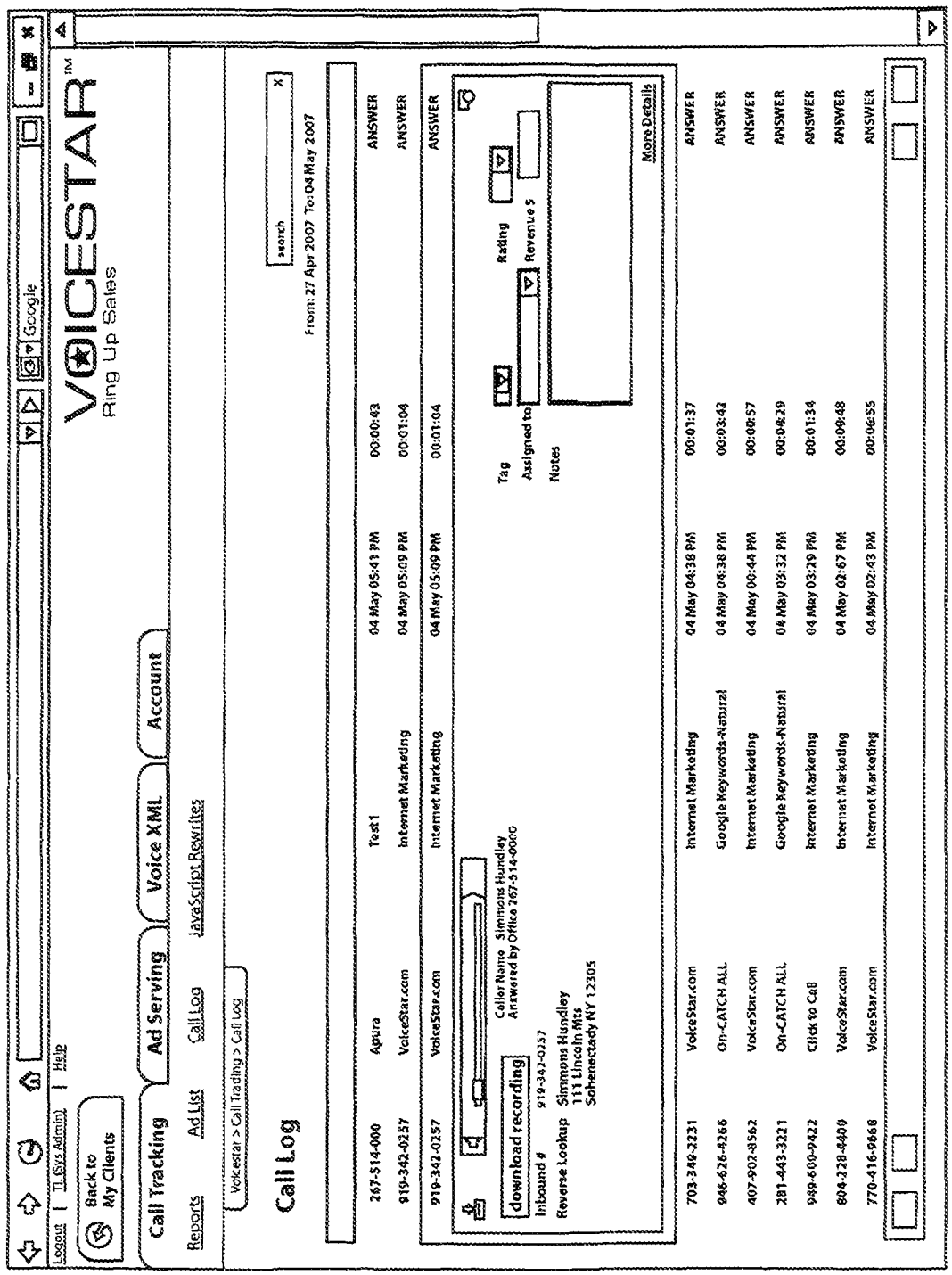

Turning now to FIG. 6, a user interface 600 is provided to enable a campaign advertiser 320 to make such rule modifications and/or to assign phone numbers to various ad campaigns as desired. An advertiser 320 can use the interface to configure various advertising campaigns and to associate phone numbers to specific advertising campaigns pursuant to the assignment and configuration phase 202, described above in connection with FIG. 2.

Using the interface 600, the advertiser 320 assigns an individual advertising campaign 602 to an individual phone number 604. (These phone numbers 604 become phone numbers 302 during a user call.) For example, a search term or keyword can constitute a first campaign and be assigned to a first phone number. An adword can be assigned to a second campaign. Referrals from a particular search engine, such as GOOGLE® or YAHOO!® can be assigned to a third campaign. Using the interface 600, the advertiser 320 can also indicate which phone. number 606 that the system is to transfer calls to in step 518 of the phone flow. (These phone numbers represent the existing phone numbers 308). In addition, the advertiser 320 can indicate certain phone numbers, such as fax numbers, service or parts numbers, and the like, to exclude during the page modification algorithm 226 process.

FIG. 6 also shows the interface 610 which can be used to insert a graphic image of phone number 302 as described above.

Turning now to FIGS. 7-12, the system also includes a way to communicate data logged via the system 100 to the advertiser 320. During the report generation phase 208, the data logged by the system 100 can be displayed to the advertiser 320. In the embodiment of the invention shown in FIGS. 7-12, that data is an HTML web page that is accessible to the advertiser via the Internet. For each call made to a phone number 604 associated with a campaign 602, data is logged and collected. For example, this data may include the time and date of the call, the phone number called from, the assigned phone number called, the area code of the customer, the associated zip code of the customer, the status of the call, and the like. This data can be presented in various textual or graphical forms to the client as is known to those skilled in the art. Such reports are illustrated in FIGS. 7-12.

In an embodiment of the invention the system includes a marketplace for advertising. A customer, such as a business owner, provides advertising for his business. The system 100 is used, as described above, to assign a phone number to this advertising. The ad with the assigned number is displayed to a potential customer on a medium of a publisher, such as a web page. The ad can be displayed based on various parameters known in the advertising industry to target the potential customer. Users can then call the assigned phone numbers. Call data is tracked as set forth above and passed on to the customer. It is contemplated that the advertiser will pay the publisher for each lead generated in this manner and that revenue can be divided between the publisher and the operator of the system based on agreed upon terms.

It is further contemplated that the customer can provide a bid price of the amount he is willing to spend along with predefined limits and the various publishers can provide asking prices they are willing to accept for publishing the ad. In this way a marketplace for telephonic response advertising can be effected and tracked and revenue distributed using the system of the present invention.

The operation of the system 100 will now be described. Using the interface 600 the advertiser 320 assigns telephone numbers 604 to various ad campaigns 602. For example, a manufacturer of widgets sets up the first advertising campaign to be a print advertisement and assigns it to a first telephone number. The second campaign is set up for the keyword "widget" and is assigned a second telephone number. A third ad campaign is set up to track referrals from the search engine GOOGLE® and is assigned a third telephone number. The widget client associates all three advertising campaigns with his company's sales department telephone number. The widget client has a webpage accessible from the Internet at URL www.widgets.com that displays the sales department telephone number. Lastly, the widget client prints up a sales brochure which is massed mailed to ten thousand potential customers. The brochure has the first assigned telephone number printed on it instead of the company sales telephone number.

Potential customers receiving the sales brochure and who are interested in purchasing widgets will call the first assigned telephone number since it is displayed as the widget company's sales number. Alternatively, the widget client could have run a radio or television advertisement that communicated the first assigned telephone number to potential clients.

Other potential customers performing an Internet search for any search term that is associated with the Widget company using the search engine GOOGLE® will find links to widgets.com. Potential customers following those links will see a proxy version of the widgets.com homepage. When the potential customer sends a http request for widgets.com the proxy server of the system 100 intercepts the request, analyzes the request to determine that the referral came from the search engine GOOGLE® and initiates a new request to widgets.com for the index page. Upon receiving the index page from widgets.com the system using the rule supplied by the widget manufacturer replaces the HTML code for the Widget company sales telephone number with the second advertising campaign sales telephone number. The modified webpage is then displayed to the potential customer. If this customer is interested in purchasing widgets, he will call the second campaign number since it is displayed as the widget company sales telephone number.

Similar to the second customer, potential customers who use any Internet search engine to find the keyword "widget" and following a link generated by the search engine pointing to the widgets.com URL will be shown the widgets Company homepage with the third advertising campaign telephone number listed as the sales number.

Upon calling the phone number displayed to them, the potential clients will access the system 100, will proceed through the phone flow 500 and the call will be transferred to the widget client's sales department in the normal course of business. The system logs the data for each incoming phone call. In particular, the system 100 logs the particular advertising campaign each potential customer called.

After a period of time, the widget client can access the real time reports generated by the system 100 to determine the efficacy of each of the advertising campaigns he has initiated as set forth in FIGS. 7-12.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A method for automatically generating at least one new webpage for at least one advertising campaign to collect data about the at least one advertising campaign, comprising:
creating a plurality of advertising campaigns associated with a single advertiser;
assigning, with at least one telephony application executed by at least one telephony interface, at least one campaign phone number to each of the advertising campaigns;
storing configuration data including the plurality of advertising campaigns, at least one page modification rule, and the campaign phone numbers;
receiving, with at least one server application executed by at least one server, data associated with at least one request from at least one user, made in response to at least one of the advertising campaigns, to display at least one webpage;
analyzing, with the at least one server application, the data associated with the at least one request to determine which advertising campaign is associated with the at least one request; and
generating and displaying the at least one new webpage, wherein the at least one new webpage is substantially a copy of the at least one webpage with the at least one campaign phone number from the configuration data added to the at least one new webpage, the generating comprising:
with at least one embedded element embedded in HTML code of the at least one webpage and the at least one server:
in response to receiving the data associated with the at least one request, executing the embedded element, the executing triggering the at least one server to identify at least one request parameter within the data associated with the at least one request and use the at least one request parameter to identify the stored configuration data for the at least one advertising campaign,
modifying, with the at least one embedded element, the at least one webpage according to the at least one page modification rule, the modifying including inserting the at least one campaign phone number into the at least one webpage to generate the at least one new webpage, and
displaying the at least one new webpage.

2. The method of claim 1, further comprising monitoring phone traffic for the at least one campaign phone number before assigning the at least one campaign phone number to each of the advertising campaigns.

3. The method of claim 1, further comprising:
analyzing the at least one webpage to identify at least one pre-existing phone number.

4. The method of claim 3, wherein the at least one pre-existing phone number on the at least one webpage and the at least one campaign phone number on the at least one new webpage are displayed as text.

5. The method of claim 3, wherein the at least one pre-existing phone number on the at least one webpage and the at least one campaign phone number on the at least one new webpage are displayed as graphics.

6. The method of claim 1, further comprising transmitting, with the at least one server application, at least one cookie to facilitate future requests.

7. The method of claim 1, further comprising:
accepting, with at least one telephonic connector coupled to at least one telephone network, at least one phone call placed to the at least one campaign phone number;
identifying, with the at least one server application, the advertising campaign associated with the at least one campaign phone number; and
recording, with at least one recording application executed by at least one recording server, phone call data associated with the at least one phone call.

8. The method of claim 7, further comprising playing, with the at least one telephonic connector, at least one ring tone on the at least one phone call.

9. The method of claim 7, further comprising:
determining, with the at least one telephony application, a time at which the at least one phone call is accepted;
determining, with the at least one telephony application, whether the time is within business hours; and
playing, with the at least one telephonic connector, a first message on the at least one phone call if the time is within business hours and playing, with the at least one telephonic connector, a second message on the at least one phone call if the time is not within business hours.

10. The method of claim 7, further comprising generating, with the at least one telephony application, at least one report using the phone call data.

11. The method of claim 9, further comprising transferring, with the at least one telephony application, the at least one report to at least one advertiser.

12. The method of claim 7, further comprising transferring, with the at least one telephonic connector, the at least one phone call to at least one advertiser.

13. The method of claim 7, further comprising terminating, with the at least one telephonic connector, the at least one phone call after recording the phone call data.

14. The method of claim 9, further comprising terminating, with the at least one telephonic connector, the at least one phone call after playing the first message or the second message.

15. The method of claim 7, further comprising:
identifying, with the at least one telephony application, at least one campaign phone number as a blacklisted number associated with an inactive campaign;
determining, with the at least one telephony application, whether the at least one campaign phone number is blacklisted after accepting the at least one phone call; and
terminating, with the at least one telephony application, the at least one phone call if the at least one campaign phone number is blacklisted.

16. A system for automatically generating at least one new webpage for at least one advertising campaign to collect data about the at least one advertising campaign, comprising:
at least one server comprising at least one server application;

at least one telephony interface coupled to the at least one server;
at least one database coupled to the at least one server and at least one telephony interface; and
optionally, at least one proxy server coupled to the at least one server;
wherein the at least one server application is configured to:
create a plurality of advertising campaigns associated with a single advertiser,
locate the at least one campaign phone number associated with each of the advertising campaigns in the at least one database,
store configuration data in the at least one database, the configuration data including the advertising campaign, at least one page modification rule, and at least one campaign phone number,
accept at least one request, made in response to the advertising campaign, to display at least one webpage,
analyze the at least one request to determine which advertising campaign is associated with the request; and
causing the at least one new webpage to be generated and displayed, wherein the at least one new webpage is substantially a copy of the at least one webpage with the at least one campaign phone number from the configuration data added to the at least one new webpage, the generating comprising:
with at least one embedded element embedded in HTML code of the at least one webpage and the at least one server:
in response to receiving the data associated with the at least one request, executing the embedded element, the executing triggering the at least one server to identify at least one request parameter within the data associated with the at least one request and use the at least one request parameter to identify the stored configuration data for the at least one advertising campaign,
modifying, with the at least one embedded element, the at least one webpage according to the at least one page modification rule, the modifying including inserting the at least one campaign phone number into the at least one webpage to generate the at least one new webpage, and
displaying the at least one webpage;
and wherein
the at least one telephony interface comprises at least one telephony application configured for assigning the at least one campaign phone number to each of the advertising campaigns and storing the assigned at least one campaign phone number in the at least one database.

17. The system of claim 16, wherein the at least one server application is further configured to:
analyze the at least one webpage to identify at least one pre-existing phone number.

18. The system of claim 17, wherein the at least one pre-existing phone number on the at least one webpage and the at least one campaign phone number on the at least one new webpage are displayed as text.

19. The system of claim 17, wherein the at least one pre-existing phone number on the at least one webpage and the at least one campaign phone number on the at least one new webpage are displayed as graphics.

20. The system of claim 16, wherein the at least one telephony application is further configured for monitoring phone traffic for the at least one campaign phone number before assigning the at least one campaign phone number to each of the advertising campaigns.

21. The system of claim 16, further comprising:
at least one recording server comprising at least one recording application;
at least one telephonic connector coupled to at least one telephone network; wherein:
the at least one telephonic connector is configured to accept at least one phone call placed to the at least one campaign phone number,
the at least one server application is further configured to determine whether the at least one campaign phone number to which the at least one phone call is placed is associated with an advertising campaign and identify the advertising campaign associated with the at least one campaign phone number to which the at least one phone call is placed, and
the at least one recording application is configured to record phone call data associated with the at least one phone call.

22. The system of claim 21, wherein the at least one telephony application is further configured to:
identify at least one campaign phone number as a blacklisted number associated with an inactive campaign;
determine whether the at least one campaign phone number is blacklisted after accepting the at least one phone call; and
terminate the at least one phone call if the at least one campaign phone number is blacklisted.

23. The system of claim 21, wherein the at least one telephonic connector is configured to play at least one ring tone on the at least one phone call.

24. The system of claim 21, wherein:
the at least one telephony application is further configured to determine a time at which the phone call is accepted and determine whether the time is within business hours, and
the at least one telephonic connector is further configured to play a first message on the at least one phone call if the time is within business hours and play a second message on the at least one phone call if the time is not within business hours.

25. The system of claim 21, wherein the at least one server application is further configured to generate at least one report using the phone call data.

26. The system of claim 25, wherein the at least one server application is further configured to transfer the report to at least one advertiser.

27. The system of claim 21, wherein the at least one telephonic connector is further configured to transfer the phone call to at least one advertiser.

28. The system of claim 21, wherein the telephonic connector is further configured to terminate the phone call after the phone call data is recorded.

29. The system of claim 24, wherein the telephonic connector is further configured to terminate the phone call after playing the first message or the second message.

30. The system of claim 16, wherein the at least one server further comprises at least one proxy server.

31. The system of claim 16, wherein the server application is further configured to transmit at least one cookie to facilitate future requests.

32. The method of claim 7, further comprising collecting a payment from an advertiser associated with the at least one of the advertising campaigns associated with the at least one phone call placed to the at least one campaign phone number.

33. The method of claim 1, further comprising:
receiving at least one bid from at least one advertiser; and
assigning the at least one campaign phone number to the at least one of the advertising campaigns associated with the at least one advertiser based on the at least one bid.

34. The method of claim 7, further comprising executing, with the at least one telephonic connector, at least one answer application during the at least one phone call.

35. The method of claim 7, further comprising executing, with the at least one telephonic connector, at least one call wrap-up application after the at least one phone call.

36. The system of claim 21, wherein the at least one server application is further configured to collect a payment from an advertiser associated with the at least one of the advertising campaigns associated with the at least one phone call placed to the at least one campaign phone number.

37. The system of claim 16, wherein the at least one telephony application is further configured to:
receive at least one bid from at least one advertiser; and
assign the at least one campaign phone number to the at least one of the advertising campaigns associated with the at least one advertiser based on the at least one bid.

38. The system of claim 21, wherein the at least one telephony application is further configured to execute at least one answer application during the at least one phone call.

39. The system of claim 21, wherein the at least one telephony application is further configured to execute at least one call wrap-up application after the at least one phone call.

40. The method of claim 1, further comprising transmitting, with the at least one server application, the at least one new webpage to the at least one user.

41. The system of claim 16, wherein the at least one server application is further configured to send the at least one new webpage.

42. The method of claim 1, further comprising cleaning, with the at least one telephony application, the at least one campaign phone number by determining that unwanted phone traffic associated with the at least one phone number is below a defined threshold.

43. The method of claim 42, wherein cleaning the at least one campaign phone number comprises monitoring, with the at least one telephony application, phone traffic associated with the at least one campaign phone number over an interval of time.

44. The method of claim 42, wherein cleaning the at least one campaign phone number is performed prior to assigning the at least one campaign phone number.

45. The method of claim 42, wherein cleaning the at least one campaign phone number is performed concurrently with assigning the at least one campaign phone number.

46. The system of claim 16, wherein the at least one server application is further configured to clean the at least one campaign phone number by determining that unwanted phone traffic associated with the at least one phone number is below a defined threshold.

47. The system of claim 46, wherein the at least one server application is configured to clean the at least one campaign phone number by a process comprising monitoring phone traffic associated with the at least one campaign phone number over an interval of time.

48. The system of claim 46, wherein the at least one server application is configured to clean the at least one campaign phone number prior to assigning the at least one campaign phone number.

49. The system of claim 46, wherein the at least one server application is configured to clean the at least one campaign phone number concurrently with assigning the at least one campaign phone number.

* * * * *